Jan. 30, 1962 H E. LEESER 3,019,074

TIME RECORDING DEVICE AND CARD THEREFOR

Filed Sept. 28, 1959 6 Sheets-Sheet 1

INVENTOR.
H Edgar Leeser

BY

K. A. Vanchun

Jan. 30, 1962 H E. LEESER 3,019,074

TIME RECORDING DEVICE AND CARD THEREFOR

Filed Sept. 28, 1959 6 Sheets-Sheet 2

INVENTOR.
H Edgar Leeser

BY

K. Afanchen

INVENTOR.
H Edgar Leeser
BY
K. A. Fancher

Jan. 30, 1962 H. E. LEESER 3,019,074

TIME RECORDING DEVICE AND CARD THEREFOR

Filed Sept. 28, 1959 6 Sheets-Sheet 4

INVENTOR.
H Edgar Leeser
BY
K. A. Fancher

Jan. 30, 1962 H. E. LEESER 3,019,074

TIME RECORDING DEVICE AND CARD THEREFOR

Filed Sept. 28, 1959 6 Sheets-Sheet 5

INVENTOR.
H. Edgar Leeser
BY
K. A. Faucher

INVENTOR.
H Edgar Leeser
BY
K.A. Faucher

United States Patent Office 3,019,074

Patented Jan. 30, 1962

3,019,074

TIME RECORDING DEVICE AND CARD THEREFOR

H Edgar Leeser, 501 Taylor St., San Francisco 2, Calif.

Filed Sept. 28, 1959, Ser. No. 842,987
6 Claims. (Cl. 346—85)

The present invention relates to time recording devices such as are employed to mark the time of arrival and departure of persons or vehicles, or the commencement and end of working periods, on employment cards, parking tickets, cost sheets, and the like. Devices of this type comprise usually a clock mechanism that sets an adjustable stamp and the stamp in turn forms part of a normally idle printing mechanism that is activated for operation to print the time of the day and the date upon a card whenever the card is placed into a predetermined position relative to the printing mechanism. This is usually accomplished by providing a chute or frame into which the card is placed and which holds the card in the proper position relative to the printing mechanism, the arrangement being such that a part of the leading edge of the card acts as a camming means that trips an operational switch for the printing mechanism, which switch is located at the remote end of the chute.

Cards of the type here under consideration are generally used repeatedly over varying periods of time, and in using such cards in connection with recording devices of the kind described, provision must be made that each new recording be printed in a new line above or below the information previously recorded on the card. This may be accomplished by a clipping knife which is arranged to operate in unison with the printing mechanism, and which clips a portion from the camming edge of the card to a depth sufficient to make it necessary for the card to be pushed deeper into the chute before the newly formed edge can again actuate the control switch of the printing mechanism. In devices of this type, the information printed on the card whenever the holder enters or leaves his place of employment, appears in a column of superposed lines. In this column the lowest line and all odd lines represent times at which the holder entered his place of employment, and all even lines represent times at which the holder left his place of employment.

At the end of a predetermined period of time, the cards with the working record of the holder printed thereon serve as a basis for computing the holder's wages or the cost of the article on which he worked. For this purpose a clerk deducts the times of arrival from the directly subsequent times of departure to ascertain the number of hours in which the holder of the card was at his place of work.

To select the data representing times of arrival or times of departure respectively, from a column of superposed lines is cumbersome and subject to human error. In entering the data on the card into an adding machine, a clerk may skip a line and use as time of arrival information that actually represented time of departure, and vice versa, thus arriving at entirely erroneous figures in the computation of salaries or charges. To trace the cause for such errors and find the erroneous entry in the adding machine is a time-consuming and cumbersome task.

It is an object of my invention to ease the task of the clerk who computes wages or charges from time cards of the type referred to.

More particularly, it is an object of my invention to minimize the possibility for a clerk to take erroneous readings from time cards of the type referred to.

Still another object of my invention is to provide a recording card and a time recording mechanism which cooperate in such a manner that times of arrival and times of departure are printed on the card in a distinctly different manner so that there is no danger that one may erroneously be taken for the other.

It is a specific object of my invention to provide a time-recording card and a time-recording machine which cooperate in such a manner that the times of arrival and the times of departure recorded on any card presented to the machine, are always automatically printed in different colors, without need for manual setting of the printing mechanism by the holder of the card and also without need to limit use of the recording device to predetermined time intervals either for marking the time of arrival or the time of departure, respectively.

Furthermore, it is an object of my invention to provide a time recording card adapted upon insertion into the guide chute of a time recording device, to condition said device for printing in different colors depending on whether the information to be recorded thereon represents a time of arrival or a time of departure.

These and other objects of my invention will be apparent from the following description of the accompanying drawings which illustrate certain preferred embodiments thereof and wherein—

Figure 1:
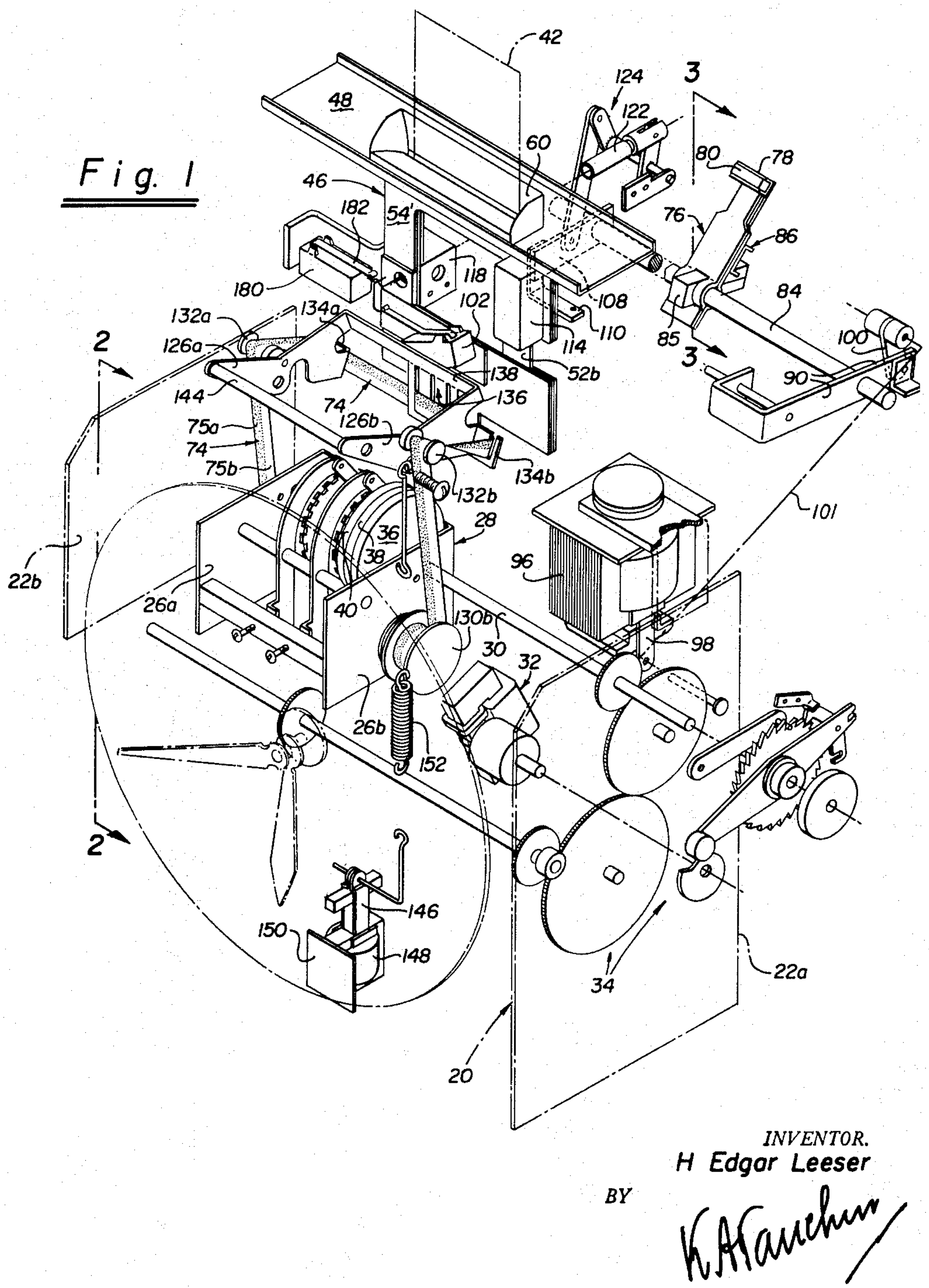
FIGURE 1 is a fragmentary exploded perspective of a time recording device embodying my invention.

The time recording device within which my invention is embodied comprises a frame structure 20 composed of two transversely spaced vertically disposed side plates **22*a* and 22*b* that are shown in phantom lines in FIGURE 1 and which are held in position by a transverse bar (not shown). Rotatably supported in the right side plate 22*b* of the frame 20 and the side plates 26*a* and 26*b* of a cage 28 that is rigidly supported from the above mentioned transverse bar is a timing shaft 30 that is intermittently turned by a clock mechanism schematically indicated at 32, which is secured to the side plate 22*b* and which is operatively connected to the timing shaft 30 by a suitable transmission indicated at 34**. Firmly mounted upon the timing shaft is a wheel 36 whose peripheral edge carries types adapted to print the hundred divisions of an hour, and rotatably supported from the timing shaft 30 adjacent the wheel 36 and driven from said wheel by a suitable transfer mechanism (not shown) is another type wheel 38 whose peripheral edge carries types adapted to print the twenty-four hours of a day. Adjacent the hour wheel 38 and driven from the hour wheel by a suitable transfer mechanism yet another wheel 40 (FIGURE 2) is rotatably supported on the timing shaft 30 and its peripheral edge may be adapted to print symbols that are indicative of the seven days of a week.

Figure 10:
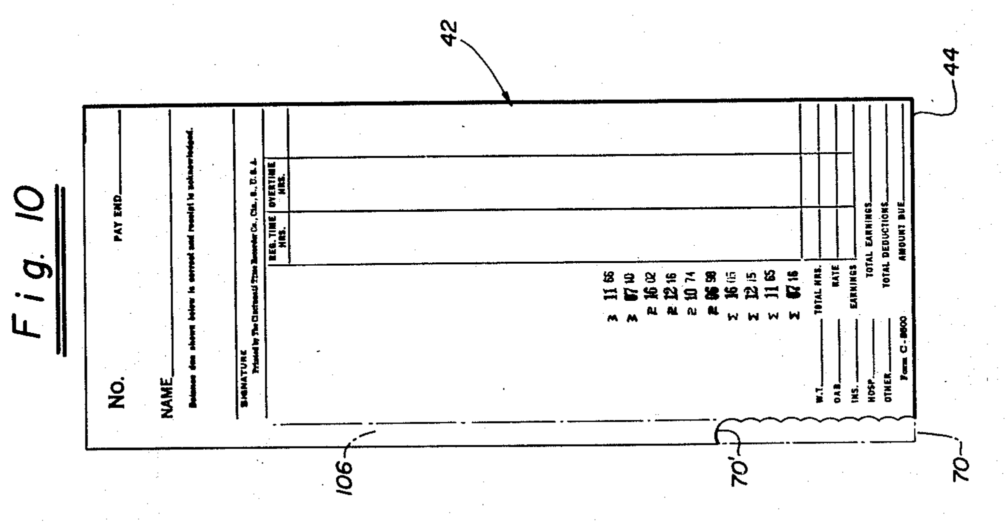
FIGURE 10 is a plan view of a time card such as may be employed in connection with the machine of my invention.

Means are provided to hold an employment or cost accounting card 42 adjacent the rearmost points of the type wheels 36, 38 and 40, in such a manner that the particular time which they indicate at the moment may effectively be marked upon said card at a predetermined level relative to the bottom edge 44 thereof. For this purpose, a rectangular guide frame 46 is supported from a cross bar 48 placed upon the top edges of the side plates 22*a* and 22*b*, with its open interior 50 adjacent the rear segments of the type wheels. Said frame 46 comprises a pair of vertically disposed side bars 52*a* and 52*b* of a thickness somewhat larger than the thickness of a card, that are spaced apart in a direction transversely of the machine by a distance about equal to the width of the card; and secured to the upper halves of said bars at either side thereof and in flat contact with said bars are inverted U-shaped plates 54′ and 54″ (FIGURES 4 and 6) that extend across the space between said side bars and whose shanks project a limited distance beyond the inner edges of said bars to form narrow vertical channels adapted to receive and guide a card intermediately thereof. To facilitate insertion of a card into the space defined by and between the U-shaped plates 54′ and 54″, the upper edges of said plates are bent outwardly to form flanges 58′ and 58″ (FIGURES 4 and 7) which carry a funnel structure 60. Secured to the lower halves of the side bars 52*a* and 52*b* at either side thereof and in flat contact with the surfaces of said side bars, are bars 62*a*′, 62*a*″ and 62*b*′, 62*b*″ respectively (FIGURES 4, 6 and 7) which form a continuation of the guide channels established by the shanks of plates 54′ and 54″. To limit the extent to which a card may be inserted into the guide chute, and thus present a predetermined area of the card to the rearmost types on the wheels 36, 38 and 40 for operation thereon by said types, a horizontal finger 64 at the upper end of an arm 66 (FIGURES 4, 5 and 7) extends through a circular opening 67 in a guard plate 68 into the space between the lower ends of the left shanks of U-shaped plates 54′ and 54″ and the upper ends of the guide bars 62*a*′ and 62*a*″ respectively, to block deeper insertion of the card into the guide frame by engaging a lateral part 70 of the leading (bottom) edge 44 of the card (FIGURE 10). The arm of the blocking finger 64 may be adjustably secured to a mounting plate 72 that is secured to the guide bar 62*a*′.

Figures 2, 3:
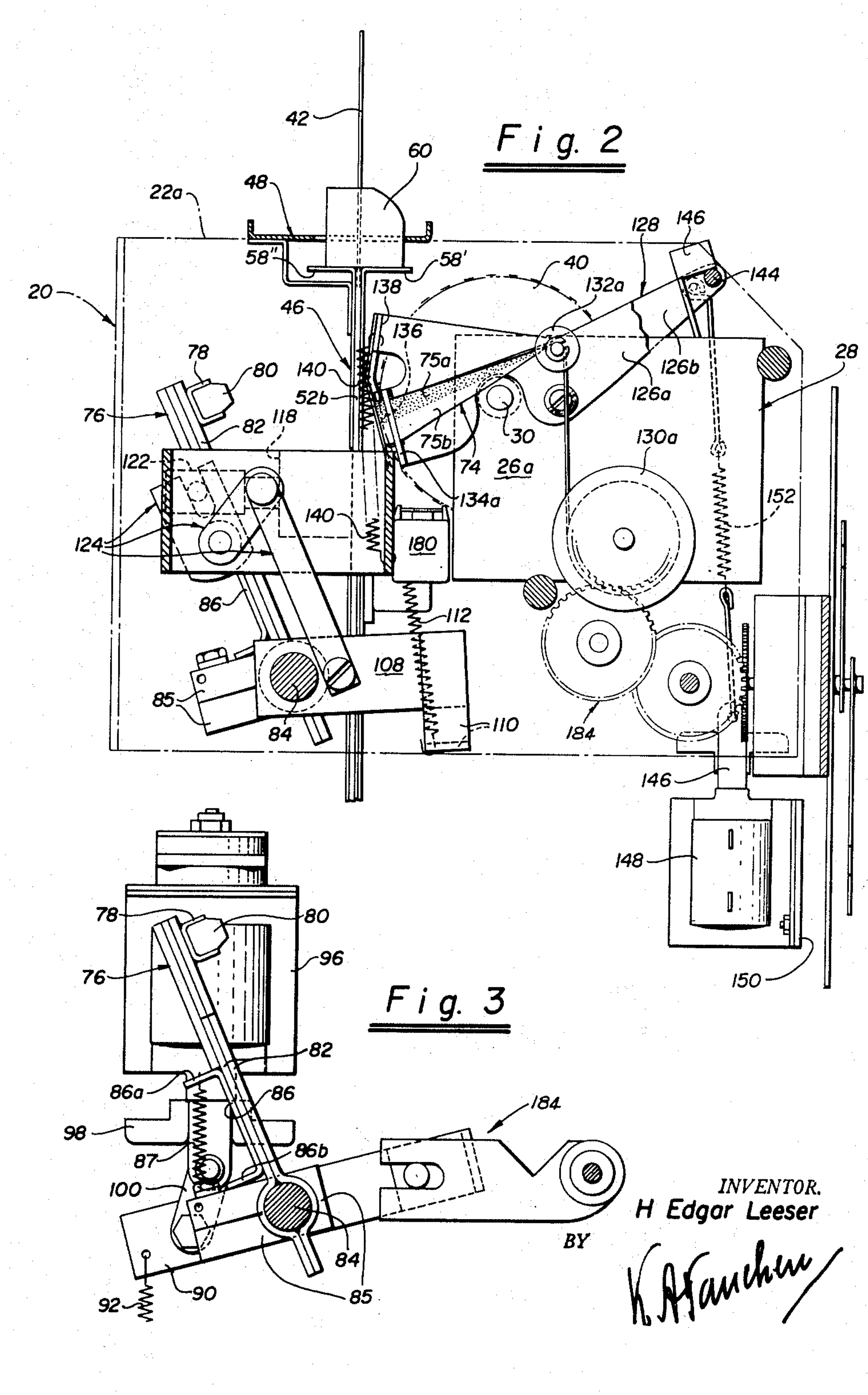
FIGURE 2 is a vertical section through the device illustrated in FIGURE 1 taken along line 1—1 thereof and viewed in the direction of the arrows associated with said line.
FIGURE 3 is an enlarged detail view representing a section taken along line 3—3 of FIGURE 1 and viewed in the direction of the arrows associated with said line.
Figure 9:
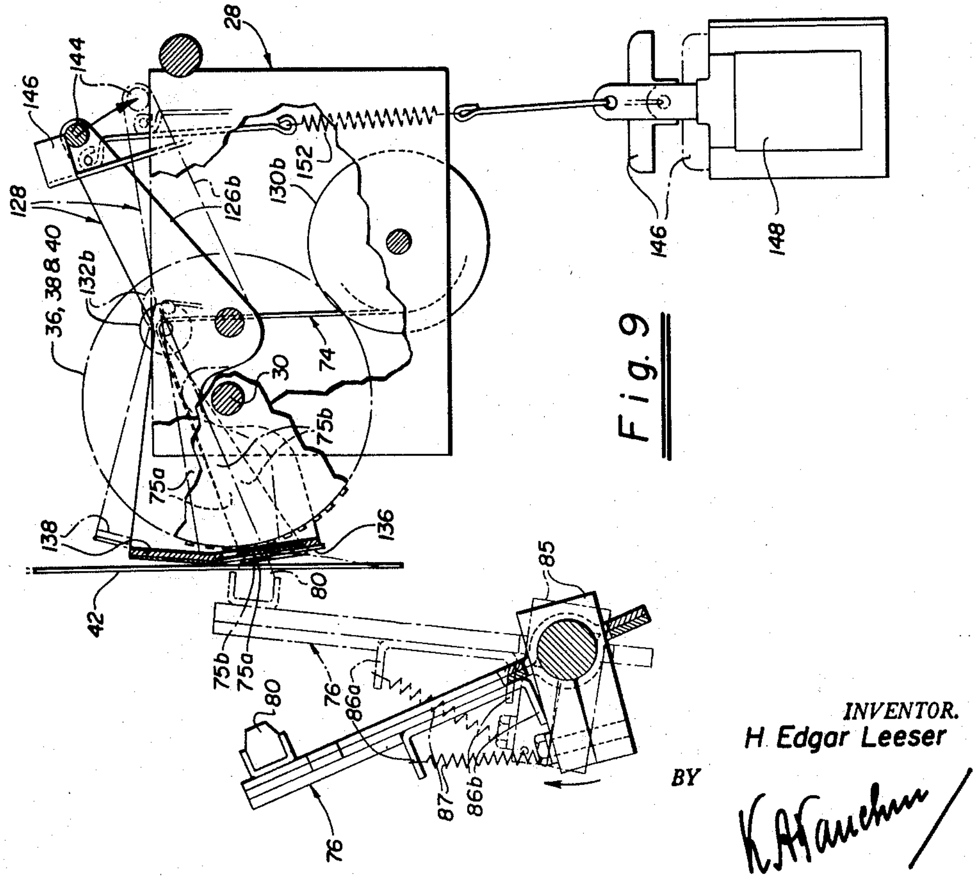
FIGURE 9 is a fragmentary side elevation of a time-recording card and of the mechanisms involved in printing the time upon the card.

To print the time represented by the rearmost types of the wheels 36, 38 and 40 upon the front face of a card within the guide frame, an inking ribbon 74 is arranged between the rearmost points of the time wheels and the space of the guide frame that is occupied by the card (FIGURES 1 and 9) and arranged behind the guide frame 46 is a normally idle hammer 76 (FIGURES 1, 2 and 3) that is actuated to swing forwardly and strike against the rear surface of a card within guide frame 46 at an area opposite to the rearmost points of the type wheels whenever the card has reached its proper place in the guide frame as determined by the blocking finger 64. The hammer 76 is formed by a short horizontally disposed channel 78 within which is held a block of hard rubber 80 and which is secured to the upper end of an arm 82. The arm 82 has a forked lower end that is rotatably mounted upon a transverse shaft 84 and firmly secured to said shaft intermediately of the forks formed at the lower end of arm 82 is a block 85. Secured to the rear side of the arm 82 is a U-shaped bracket 86 and a spring 87 tensioned between the upper ear 86*a* of said bracket and said block 85 holds the hammer arm 82 yieldably in a rearwardly tilted position wherein the lower ear 86*b* of said bracket bears against the block 85 (FIGURES 3 and 9). The shaft 84 extends between and is suitably journaled in the hereinbefore mentioned side plates 22*a* and 22*b* of the machine frame 20. Likewise secured to the shaft 84 is a lever 90 (FIGURE 1) and a spring 92 tensioned between the rear end of said lever and a suitable point of the frame plate 22*b* below the level of shaft 84 holds said shaft in a rotary position wherein the hammer 76 is withdrawn from the plane of the guide frame 46.

Secured to the side plate 22*b* above and rearwardly of the shaft 84 is a solenoid 96 (FIGURES 1 and 3) which has a normally projected armature 98 that is pivotally connected to the lever 90 at a point intermediately of is rear end and the shaft 84 by a link 100 (FIGURE 3). In the exploded view shown in FIGURE 1 this connection is symbolically indicated by the phantom line 101. Whenever the solenoid 96 is energized and retracts its armature 98, it turns the lever 90 and hence the shaft 84 abruptly a limited distance in a clockwise direction as viewed in FIGURE 3. This swings the block 85 and hence the hammer 76 toward the guide frame 46 to a position a distance short of the plane of the guide frame, but the hammer 76 continues its movement toward the frame 46 under its inertia and against the urgency of spring 87 causing the rubber block 80 at its upper end to strike briefly against the rear surface of any card in guide frame 46 and in this manner push the front surface of the card through the inking ribbon 74 against the types presented by the wheels 36, 38 and 40 so that the time indicated by said wheels at the moment is printed upon the front face of the card. Immediately thereafter the spring 88 returns the hammer with its ear 86*b* into contact with the pusher block 85, so that it assumes an ineffective position withdrawn from the rear surface of the card in the guide frame 46, even though the actuating solenoid 96 may remain in energized condition.

Figures 4, 5:
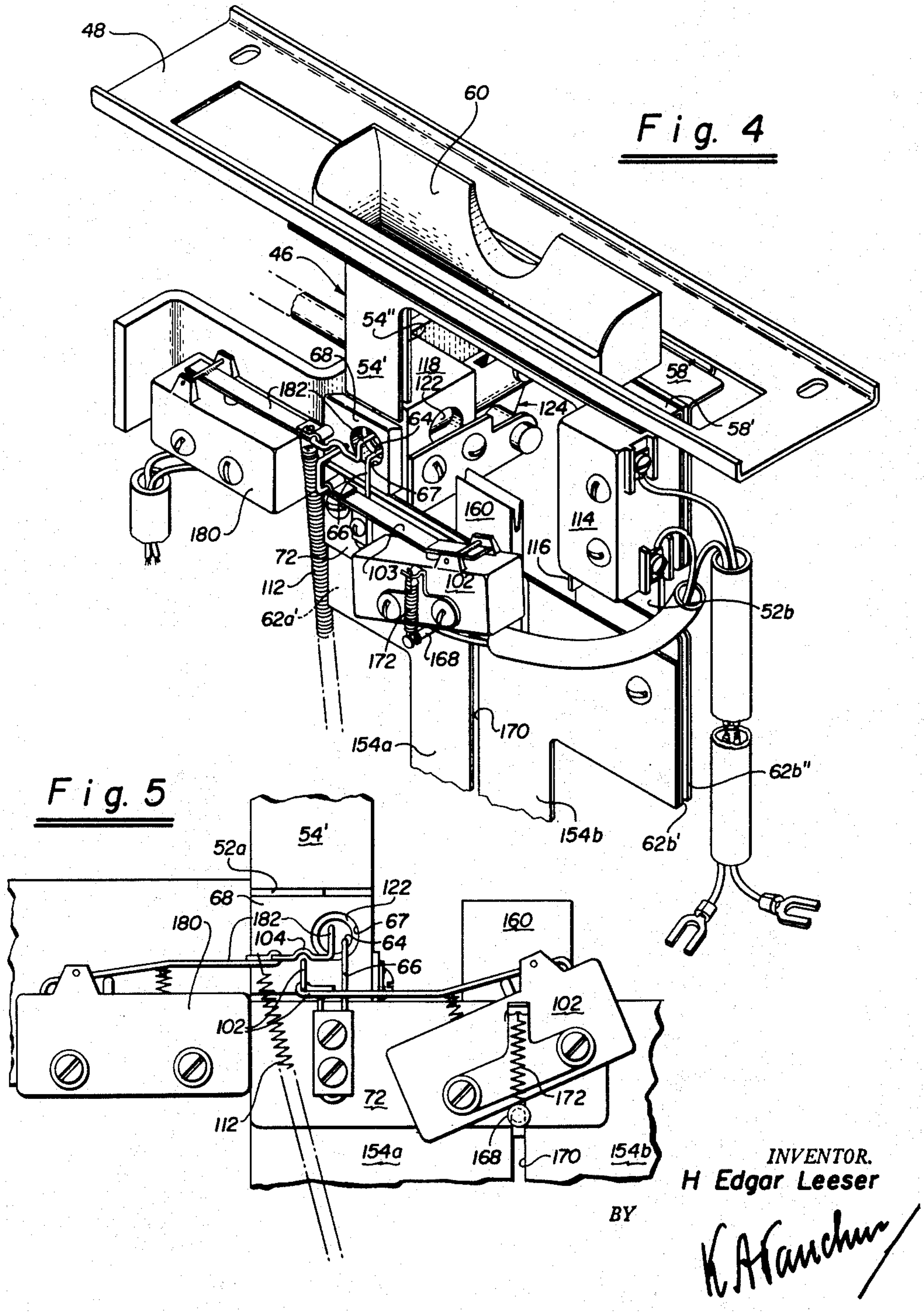
FIGURE 4 is a fragmentary perspective of the guide frame for holding the time recording card and of components associated therewith.
FIGURE 5 is a fragmentary front view of part of the components shown in FIGURE 4.
Figure 11:
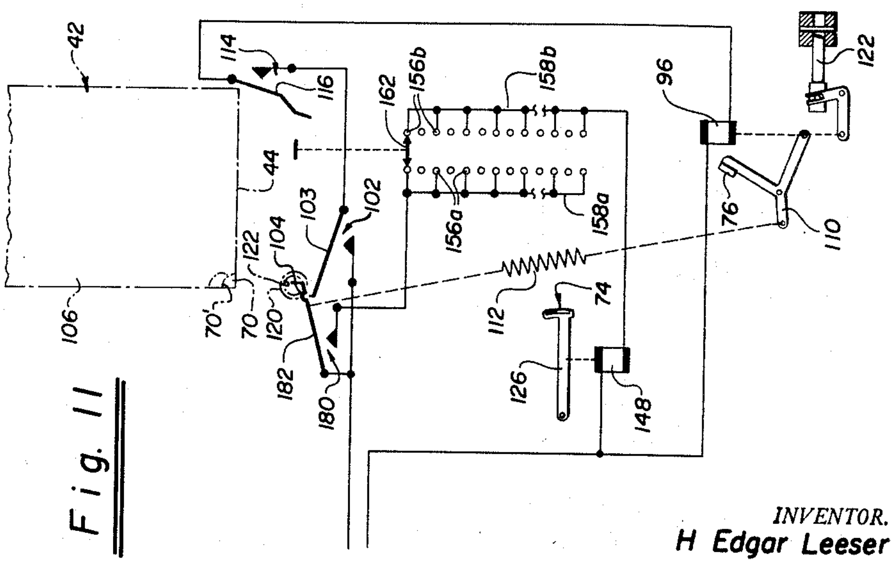
FIGURE 11 is a circuit diagram for the device illustrated in the preceding figures and particularly for the mechanisms illustrated in FIGURES 4, 5, 6 and 7.

Means are provided to energize the solenoid 96 and effect a printing stroke of the hammer 76 whenever a card has been placed into proper position within the guide frame 46, and to keep the solenoid 96 energized until the card has been withdrawn to a substantial degree from the frame. For this purpose the power circuit of the solenoid 96 (FIGURE 11) includes a normally open switch 102, the arm 103 of which is actuated by a member 104 that extends through the opening 67 in guard plate 68 into the path of the left lateral margin 106 of a card pushed into the guide frame 46 at a point adjacent to and slightly above the card-blocking finger 64 (FIGURES 4, 5 and 11). Thus, whenever a card is pushed into the guide frame and the leftmost portion 70 of its leading edge 44 is about to be blocked by the finger 64, the card closes the solenoid control switch 102 and causes energization of the solenoid 96 provided another normally open switch 114 in the power circuit of the solenoid 96 has previously been closed. Upon energization the solenoid retracts its armature 98 against the urgency of a restore spring and swings the hammer 76 into brief engagement with the rear surface of the fully inserted card 42 in the guide frame 46.

Energization of the solenoid 96 is also arranged to activate mechanism that holds the solenoid control switch 102 in closed condition even if the card which effected closure of said switch, is briefly withdrawn from the actuating member 104. For this purpose an arm 108 (FIGURES 1 and 2) is secured to the shaft 84 and fastened to the free end of said arm is a bracket structure 110; and the actuating member 104 of the switch 102 is operatively connected to said bracket by a coil spring 112. Hence, whenever the solenoid 96 is energized by closure of the switch 102 as effected by engagement of a card in frame 46 with the actuating member 104, the resultant rotational movement of the shaft 84 swings the bracket 110 away from the actuating member 104 and thus exerts a downward pull upon said member which is effective to keep the switch 102 closed and the solenoid 96 energized. Hence, inappropriate manipulation of the card as it is inserted into and positioned fully in the guide frame, is unable to effect spurious repeat performances of the printing hammer. It is only when the card is withdrawn to a substantial degree from the guide frame 46 that the solenoid 96 is permitted to become deenergized which allows the shaft 84 and the hammer 76 to return to their initial positions and thus reconditions the printing mechanism for another operational stroke of the printing hammer. For this purpose the above mentioned normally open switch 114 (FIGURES 4 and 9) is included in the power circuit of the solenoid 96. Said switch 114 may be mounted upon the right shank of the U-shaped guide plate 54 and has an actuating arm 116 (FIGURE 6) that extends into the path of a card pushed into the guide frame at a point a substantial distance above the level at which the hereinbefore described actuating member 104 of the solenoid control switch 102 is located. Hence, whenever a card is pushed into the guide frame 46, it soon reaches a position wherein its right edge engages the switch arm 116 and closes the switch 114 (FIGURES 4 and 11), which conditions the power circuit of the solenoid 96 for immediate operation as soon as upon deeper insertion of the card into the guide frame the left portion of the leading edge of the card engages the actuating member 104. Once the solenoid 96 has been energized, however, it cannot be de-energized even if the card is withdrawn from the actuating member 104 of the solenoid control switch, until the card in moving out of the guide frame has passed the actuating arm of the release switch 114 and permits said switch to open, which interrupts the power circuit of the solenoid 96, restoring the hammer 76, the bracket 110 and the solenoid control switch 102 to their initial positions.

When an employment or cost accounting card is used a second time on the described time recording mechanism, to record a subsequent time of departure or the end of an operation, it is necessary that the new time to be recorded appear in a line directly above the information previously recorded upon the card. For this reason conventional time-recording machines of the type here under consideration comprise means that are effective coincident with the printing stroke of the hammer, to clip from the leading (bottom) edge 44 of the card (FIGURE 10) that portion 70 of said edge which bears against the card-positioning blocking finger 64 and the actuating member 104, to precisely the depth which will present an area of the card surface directly above the last recorded information to the type wheels and the printing hammer, respectively, for operation thereon, whenever the card is again inserted into the guide frame 46 and the actuating member 104 and the blocking finger 64 are engaged by the newly established bottom edge 70' of the card positioning margin or strip 106 at the left side of the card.

Figures 6, 7, 8:
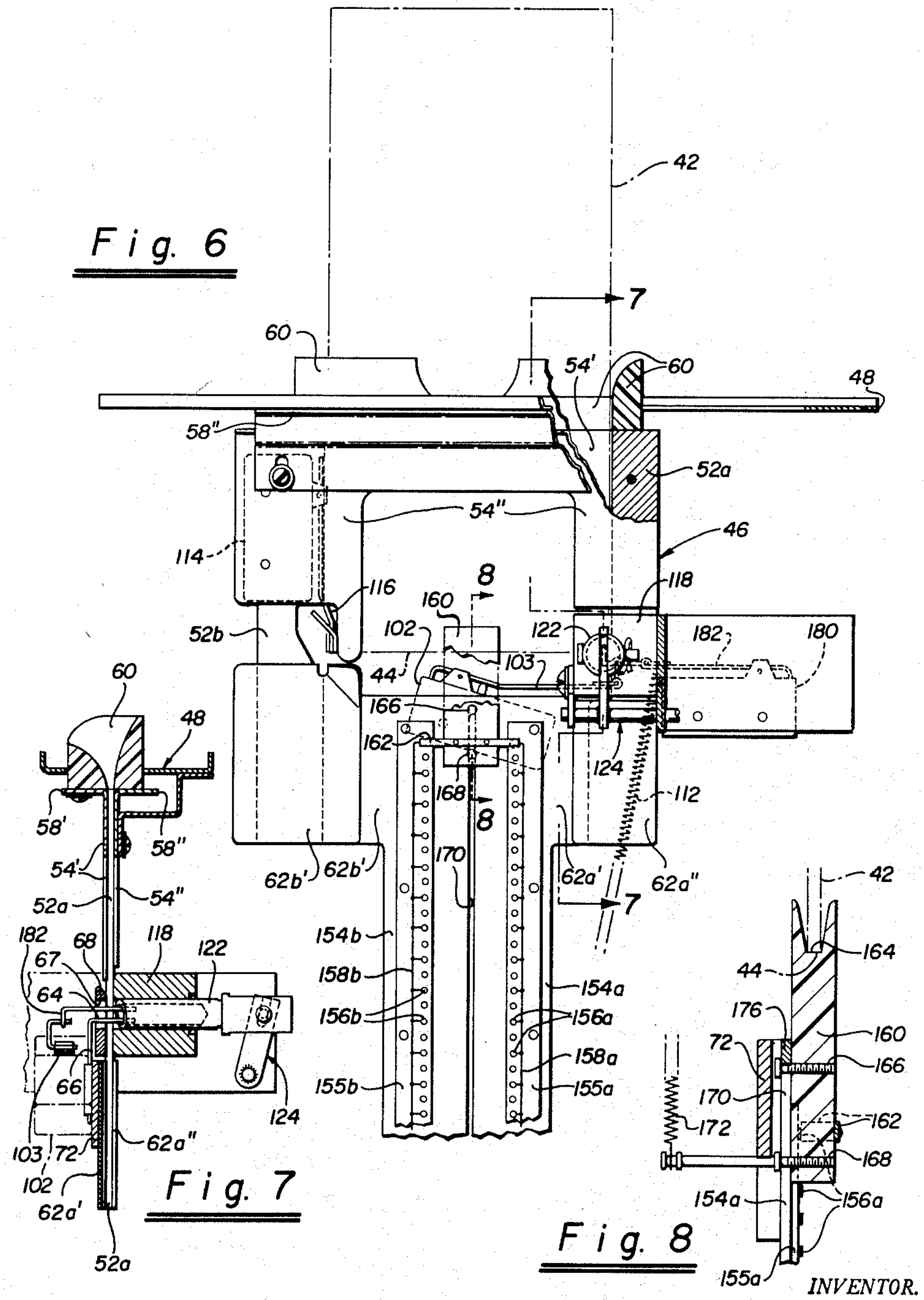
FIGURE 6 is a rear elevation of the structure shown in FIGURE 4.
FIGURE 7 is a section taken along line 7—7 of FIGURE 6 and viewed in the direction of the arrows associated with said line.
FIGURE 8 is a section taken along line 8—8 of FIGURE 6 and viewed in the direction of the arrows associated with said line.

Having reference to FIGURES 4 and 7, a block 118 is secured to the left side bar **62*a*'' of the frame structure 46 in the area opposite to the finger 64 and the actuating member 104, and said block 118 contains a cylindrical bore 120 which is aligned with the opening 67 in guard plate 68 and within which is slidably received a tubular punch 122. Said punch is operatively connected by a suitable link and lever train collectively identified by the reference numeral 124 in FIGURES 1 and 2 with the hereinbefore mentioned arm 108 that is secured to the solenoid-actuated shaft 84, such that the punch 122 is located closely adjacent to but withdrawn from the plane of a card in guide frame 46, whenever the solenoid 96 is in a de-energized condition. Whenever the solenoid 96 is energized by the closure of switch 102, however, the resultant rotation of shaft 84 is operative through the link and lever train 124 to project the punch against the card which effected closure of the solenoid control switch 102, and punch the edge portion 70 of the card engaging the actuating member 104 and the blocking finger 64 from the card to a depth effective to present a directly higher line area of the card to the type wheels whenever the card is again inserted into the guide frame and the new edge 70' of the left margin 106 of the card bears against the card-positioning finger 64. Once the punch 122 has been projected, it remains in projected position, until and unless the card which initiated the described printing and punching operations, is withdrawn from the guide chute 46 to an extent that causes its side edge to release the actuating arm 116 of the hereinbefore described release switch 114, whereupon return of the armature 98 to its projected position withdraws the punch to its position of rest in the same manner as it returns the printing hammer 76** to its initial position. Thus, any new entry to be made upon an employment or cost accounting card by the described time-recording mechanism will appear in a line directly above the previous entry made on the card.

In accordance with my invention I arrange the described time-recording machine in such a manner that entries made upon a card are automatically printed in a distinctly different and easily distinguishable manner, and in particular are automatically printed in different colors, depending on whether they represent a time of arrival (or commencement of an operation), or the time of departure (or the termination of an operation), without need for manual adjustment of the printing mechanism whenever a card is inserted into the guide frame of the machine. My invention is based upon the realization that any first entry on the card, i.e. the entry nearest the leading (bottom) edge of the card always represents a time of arrival or the commencement of an operation and so will all odd entries made upon one and the same card, while all second entries and in fact all even entries upon the card represent times of departure or times marking the termination of an operation. In accordance with the invention I therefore provide a double-colored inking ribbon that may be shifted from a position wherein it presents a first color track to the type wheels and a position wherein it presents the second color track to said wheels, and I provide means that senses the position of a card fully inserted into the guide frame to determine whether the new entry is an odd or an even one and which sets the inking ribbon to one or the other of its effective positions depending upon whether the area on a card inserted into the guide frame, upon which a new entry is to be made, represents an odd or an even line. Thus, whenever a card is inserted into the machine of the invention to have a time recorded thereon, the machine will automatically print the time in one or the other of two colors, for instance, red or blue depending on whether the recorded time is to represent a time of arrival or a time of departure on the particular card presented to the machine at the moment, without need to set the inking ribbon of the printing mechanism manually whenever cards requiring different entries are supplied at random into the guide chute of the machine.

Having again reference to FIGURES 1 and 2, the side bars **126*a* and 126*b* of a cradle in the form of a rectangular frame 128 are pivotally supported from the hereinbefore mentioned side plates 26*a* and 26*b* of the cage 28. The inking ribbon 74 has two differently colored tracks, say an upper red track 75*a* and a lower blue track 75*b* (FIGURES 1, 2 and 9) and its opposite ends are wound upon reels 130*a* and 130*b*, respectively, that are rotatably supported from the outer surfaces of the side plates 26*a* and 26*b* of the cage 28**. The connecting run of the ribbon 74 between the reels 130*a* and 130*b* is guided over pulleys 132*a* and 132*b* pivoted to the side bars 126*a* and 126*b*, respectively, of the cradle 128 and through guide forks 134*a* and 134*b* formed at the rear ends of said side bars, and passes through an apertured shield 136 that is rigidly supported from the remote end bar 138 of the cradle 128. The shield 136 holds a free portion of the ribbon in the space between the rear segments of the type wheels 36, 38 and 40 and the front surface of a card inserted into the guide frame 46. A spring 140 tensioned between the end bar 138 of the cradle 128 and a fixed point of the machine frame below said end bar holds the cradle 128 yieldably in a position, determined by engagement of its front bar 144 with a stationary limit stop 146 (FIGURE 2), wherein the rear bar 138 of the cradle is lowered and the shield 136 supported from said rear bar presents the red upper track 75*a* of the ribbon to the types at the rearmost points of the wheels 36, 38 and 40.

In this position energization of the hammer control solenoid 96 as effected by full insertion of a card into the guide frame 46 will cause the time to be printed in red upon the card in the guide frame. To set the cradle 128 to a position wherein the shield 136 places the lower track 75*b* of the ribbon, i.e. the blue track, between the remote points of the type wheels and the front surface of a card in guide frame 46 the normally projected armature 146 of a solenoid 148 (FIGURE 1) secured by a bracket 150 to the inner surface of the side plate 26*b* at a point below the level of the cradle is operatively connected by a spring 152 to the front portion of the cradle (FIGURE 9), and whenever the solenoid 148 is energized, and retracts its armature 146, the cradle 128 is rocked against the urgency of the hereinbefore mentioned spring 140 into a position determined by engagement of its front bar 144 with the top edges of the mounting plates 26*a* and 26*b*. In this position of the cradle 128 the shield 136 raises the lower track 75*b* of the ribbon 74 into the space between the rear segments of the type wheels and the front surface of a card within the guide frame 46. Thus, when the solenoid 148 is in energized position, actuation of the hammer 76 at the rear of the guide frame 46 will cause the time to be printed in blue upon the card in the guide frame indicating that it represents a time of departure or termination of a production operation.

In accordance with my invention I provide means that close a normally open switch in the power circuit of the ribbon control solenoid 148 whenever the distance between the leading edge 44 of a card inserted into the guide frame 46 to the extent permitted by engagement of the blocking finger 64 with the edge 70′ of the remaining positioning strip or margin 106 of the card indicates that the line to be printed upon a card in the guide frame will be an even one and therefore represent a time of departure. For this purpose the channel forming guide bars 62*a*′ and 62*b*″ secured to the bottom portions of the side bars 52*a* and 52*b* of frame 46 (FIGURE 4) are provided with adjacently located downwardly extending shanks 154*a* and 154*b* respectively, and secured to the rear surfaces of said shanks are vertically extending fillets of insulating material 155*a* and 155*b* (FIGURE 6). Provided in said fillets is a plurality of vertically superposed pairs of transversely spaced exposed metal contacts 156*a* and 156*b* that are of a vertical length about equal to the depth of a line printed upon the card, and which are vertically spaced from each other by an interval that is likewise equal to the depth of a line on the card. All the left contacts 156*a* and all the right contacts 156*b* are connected to common conductors 158*a* and 158*b* respectively, that form part of the power circuit for the ribbon control solenoid 148 (FIGURE 11). Said power circuit is normally interrupted due to the space between the individual contacts 156*a* and 156*b* of each pair of contacts. Intermediately of the fillets 155*a* and 155*b*, however, a slide 160 of insulating material is provided which supports a horizontally disposed strip 162 of conductive material adapted to engage and connect the contacts 156*a* and 156*b* of each pair of contacts of the fillets 155*a*, 155*b*, whenever the position of the slide, vertically of said fillets, places said strip above the two contacts of a pair. Means are provided to hold the slide 160 yieldably in an uppermost position wherein the bottom of its grooved top edge 164 (FIGURES 4 and 8) is about level with the leading (bottom) edge 44 of a new card that has for the first time been fully inserted into the guide frame 46 and whose positioning strip or margin 106 is still fully intact. The arrangement is such that when the slide 160 is in its uppermost position, it holds its conductive strip 162 directly above and out of engagement with contacts 156*a*, 156*b* and hence the power circuit of the ribbon control solenoid 148 remains interrupted. This means that any information printed upon the card by energization of the hammer control solenoid 96 appears in red indicating that it represents a time of commencement of an operation or arrival of an employee. To confine the slide 160 to vertical movement intermediately of the fillets 158*a* and 158*b* and to hold said slide yieldably in its uppermost position as defined above, a pair of vertically aligned studs 166 and 168 (FIGURE 8) may be arranged to project rearwardly from the slide and engage the vertical slot 170 formed between the shanks 154*a* and 154*b* to which the fillets of insulating material 158*a* and 158*b* are secured; and a spring 172 may be tensioned between the outwardly projecting end of the lower stud 168 (FIGURE 8) and an eye 174 secured to the casing of switch 102 (FIGURES 4 and 5) to urge the slide 160 in upward direction until the upper stud 166 comes against a positive stop 176 that may be formed at the upper end of the slot 170 (FIGURE 5).

After a card has once been exposed to the time recording machine described hereinbefore, a part has been clipped from the bottom end of its positioning strip or margin 106 to a depth sufficient to permit the card to slide deeper into the guide frame when it is inserted into said frame for a second time so as to have a time of departure printed thereon. Hence, the new information will appear in a line directly above the previously recorded information; and as the new edge 70′ of the shortened positioning strip 106 settles against blocking finger 64, the remainder of the original bottom edge of the card engages the grooved edge 164 of the slide 160, slides deeper into the guide frame 46, and pushes the slide 160 into a lower position wherein its conductive strip 162 connects the first pair of contacts 156*a* and 156*b* in the power circuit of the ribbon control solenoid 148. Energization of said solenoid, however, will not take place until another normally open switch 180 in the power circuit of the ribbon control solenoid is closed (FIGURE 11). The arm 182 of said switch carries the hereinbefore mentioned actuating member 104 (FIGURE 5) which is located in the path of the clipped end of the card-position-determining side strip 106 of the card to actuate the arm 103 of the control switch 102 in the power circuit of the hammer control solenoid 96. By arranging the switch arms 103 and 182 in such a manner that depression of the member 104 closes the switch 180 first and directly afterwards the switch 102, whenever it is engaged by the leading edge 70′ of the side strip 106 of a card pushed into the guide frame 46, the ribbon 74 will always have been shifted into its upper position wherein it presents its blue track 75*b* to the type wheels by the time the hammer 76 pushes the card through the ribbon against the type wheels to cause the time to be printed upon the front surface of the card in the proper color, provided of course that the ribbon-control-solenoid 148 is actuated at all, which it can only be if the leading edge 44 of the card placed the conductive strip 162 of the slide 160 across any one of the contact pairs in the insulating fillets 155*a*, 155*b*.

When the card is removed from the guide frame 46 after it has been exposed to the printing mechanism of the machine for a second time, the spring 172 restores the slide automatically to its topmost position. Let it now be assumed that the same card is again inserted into the guide frame 46 for marking thereon another time of arrival of its holder at his place of employment. Due to the fact that twice before portions of the side strip 106 of the card have been clipped from the lower end thereof, the leading edge 44 of the card will push the slide 160 to a position wherein its conductive strip is located intermediately of the uppermost pair of contacts and the second pair of contacts **156*a*, 156*b* counted from the top, by the time the edge 70' of the positioning strip 106 engages the actuating member 104 and closes the switches 180 and 102 in quick succession. Closure of switch 180, however, remains without effect upon the ribbon shifting solenoid 148 because none of the pairs of contacts on the shanks 154*a* and 154*b* is conductively connected, and the power circuit of the ribbon shifting solenoid therefore remains interrupted. Thus, the ribon shield 136 at the rear end of the cradle 128 presents the red track of the inking ribbon to the type wheels and since the actuating member 104 closed the switch 102 directly after it closed switch 180, the resultant energization of solenoid 96 activates the hammer and causes the time to be printed upon the card in red indicating that it signifies a time of arrival or the beginning of an operation. Hence, by providing as many pairs of contacts 156*a* and 156*b* in superposed relation upon the fillets of insulating material 158*a* and 158*b***, and spacing them vertically from each other by a distance equal to the vertical depth of a line on the card, the machine of the invention will always print the times of arrival and the times of departure in different colors upon cards presented at random to said machine, no matter how many different cards are presented to the machine, and how often and in what sequence they are presented to the machine, without need for any manual setting or adjustment of the machine every time a card is exposed to it.

It remains to point out that the machine may be provided with the conventional mechanism, collectively identified by the reference numeral 184 in FIGURE 1, for advancing the ribbon by a small increment in one or the other direction whenever the solenoid 96 actuates the hammer for an operative printing stroke, and similarly the ribbon drive mechanism may be arranged in a conventional manner to reverse itself automatically when the supply of ribbon upon one or the other reel has been exhausted. Mechanisms of this type are well known in the art and do not form part of the present invention. It is therefore unnecessary, and would only burden the disclosure of the present invention to show them in detail in the drawings and/or to describe them specifically in the present specification.

Figure 12:
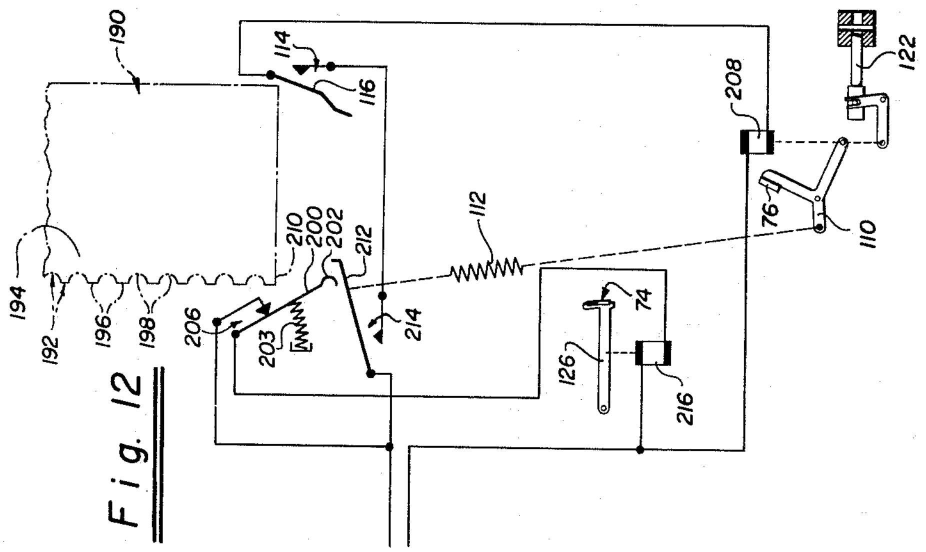
FIGURE 12 is a circuit diagram for a modified embodiment of the invention.

FIGURE 12 illustrates another embodiment of my invention which depends for proper operation upon the use of a special time card 190 whose side edge 192 adjacent the positioning strip 194 is formed into a camming edge having alternate lobes 196 and depressions 198 each of a vertical length equal to the vertical depth of the lines to be printed upon the card; and in place of the slide 160 which senses the depth to which a card may be inserted into the guide frame 46 of the embodiment of the invention illustrated in FIGURES 1 to 11, the embodiment of the invention represented by FIGURE 12 has a sensing finger 200 whose tip 202 is urged by a spring 203 against the camming edge of the card 190 when the card is inserted into the guide frame of the machine. Said sensing finger is arranged to close or open a conditioning switch 206 in the power circuit of the ribbon shifting solenoid 208 depending on whether its finger 200 engages a lobe or depression of the camming edge. When a card of the type illustrated in FIGURE 12 is inserted into the guide frame of the machine the sensing finger 200 will either engage a lobe or a depression of its camming edge at the time the leading edge 210 of the marginal positioning strip 194 of the card comes against the actuating member 212 of the main control switch 214 depending on whether an odd or even number of parts have previously been punched from the lower end of the positioning strip 192, and accordingly the power circuit of the ribbon shifting solenoid 216 is set to energize said solenoid when the actuating member 212 closes the main control switch 214 or to remain interrupted even though the main control switch 214 may be closed.

While I have explained my invention with the aid of certain exemplary embodiments thereof, it will be understood that my invention is not limited to the specific constructional details shown and described by way of example, which may be departed from without departing from the scope and spirit of my invention. Thus, while I have chosen the color red to identify times of arrival of a person or commencement of an operation and the color blue to identify times of departure of a person or of the termination of an operation, other colors may be chosen, and in fact a color scheme that is the reverse of the one illustrated and described may be adopted. Also, while in the exemplary embodiments of the invention the arrangement is such that the ribbon is normally in a position wherein it presents its arrival-identifying track to the type wheels and has to be shifted by operation of a solenoid to present its departure-identifying track to the type wheels whenever the position of the card relative to the guide frame indicates that the entry to be made is to represent a time of departure, it will be understood that machines of the invention may be arranged to operate in the reverse manner, without departing from the scope and spirit of my invention.

I claim:

1. The combination, with a time recording card having a side edge formed into a camming edge, of a time recording machine comprising a time printing mechanism settable from a position wherein it prints in a first color to a position wherein it prints in a second color; a frame adapted to receive the time recording card and present said card to said printing meechanism to mark a time thereon; cooperating card positioning means on said frame and on said card operative to hold said card at successively lower levels within said frame each time said same card is inserted into said frame, to present successively higher areas of the card to said printing mechanism; sensing means on said frame and in contact with said camming edge of the card within the frame effective to set said printing mechanism to said second position thereof for predetermined ones of said successively lower levels thereof within said frame; and means operative whenever the card is fully inserted into said frame to the depth determined by said card positioning means, to actuate said printing mechanism.

2. In combination, with a time card having a lateral camming edge forming alternately lobes and depressions, of a time recording machine comprising a time printing mechanism settable between a first position wherein it prints in a first color and a second position wherein it prints in a second color; a guide frame having an open end adapted to receive the time card, and blocking means adjacent the opposite end of said chute adapted to engage a portion of the leading edge of a time card inserted into said frame and hold said card in a position wherein a predetermined area thereof is presented to said printing mechanism; sensing means engaging the camming edge of a card and effective when the card is fully inserted into said frame to set said printing mechanism to its first or its second position depending on whether it engages a lobe or a recess in the camming edge of the card; a clipping mechanism mounted for movement into a position wherein it clips the edge portion of the card engaged by said blocking means from the card in the frame to establish a new edge portion and thus enable the card to slide deeper into said frame and present another area to said printing mechanism the next time said same card is inserted into said frame, and means located adjacent said blocking means in the path of said leading edge portion of a card inserted into the frame and rendered effective by contact with a card inserted fully into said frame, to activate said printing and said clipping mechanisms.

3. A time recording card adapted to bear time recording indicia and having a leading edge and a lateral edge adjacent said leading edge, said lateral edge being formed into a camming adge of alternate lobes and depressions each of a width equal to the height of the time recording indicia.

4. A time recording machine comprising a normally idle time printing mechanism settable from a position wherein it prints in a first color to a position wherein it prints in a second color, a guide frame having an open end adapted to receive a time recording card and having means adjacent its opposite end to engage a lateral portion of the leading end edge of a card inserted into said frame to hold the card in a position wherein a predetermined area thereof is presented to said printing mechanism; means operable to clip the engaged lateral portion from the leading end edge of the card to establish a new edge and allow the card to slide deeper into said frame whenever said same card is again instered into said frame, to present a higher area thereof to said printing mechanism; sensing means engaging the leading end edge of a card inserted into said frame to the depth permitted by engagement of said card holding means with said lateral end edge portion and effective in response to predetermined distances between the leading end edge of the card and said lateral edge portion to set said printing mechanism to said second position, and means rendered effective when said lateral edge portion engages said holding means to activate said printing and said clipping mechanisms.

5. A time recording machine comprising a normally idle printing mechanism having a two-colored ribbon mounted for movement from a first position wherein said mechanism prints in a first color to a second position wherein said mechanism prints in a second color; a guide frame adapted to receive a recording card; card positioning means on said guide frame for holding a card at successively lower levels within said frame whenever said same card is again inserted into said frame, to present successively higher areas of the card surface to said printing mechanism for operation thereof on said card; a first solenoid operable upon energization to set said ribbon to said second position thereof, a power circuit for said first solenoid; a plurality of vertically superposed pairs of transversely spaced contacts in the power circuit of said first solenoid arranged below said frame; a conductive member adapted to connect the contacts of each pair mounted to yield from a position adjacent the level of the leading end edge of a card that has for the first time been fully inserted into said frame, downwardly over said superposed pairs of contacts under pressure by the leading end edge of cards, pushed into said frame, that have previously been inserted into said frame; a normally open control switch in the power circuit of said first solenoid, a second solenoid operable to actuate said printing mechanism; a normally open control switch for said second solenoid; and means effective when a card inserted into said frame reaches its lowermost position as determined by said card positioning means, to close the control switch of the power circuit of said first solenoid, provided said conductive strip is in a position wherein it connects a pair of contacts, and to then close the control switch of said second solenoid.

6. The combination, with a recording card, of a time recording machine comprising a normally idle printing mechanism having a two-colored ribbon mounted for movement from a first position wherein said mechanism prints in a first color to a second position wherein said mechanism prints in a second color; a guide frame adapted to receive the recording card, cooperating card-positioning means on said card and said guide frame for holding a card at successively lower levels within said frame whenever said same card is again inserted into said frame, to present successively higher areas of the card surface to said printing mechanism for operation thereof on said card; a first solenoid operable upon energization to set said ribbon to said second position thereof, a power circuit for said first solenoid; a plurality of vertically superposed pairs of transversely spaced contacts in the power circuit of said first solenoid arranged below said frame; a conductive member adapted to connect the contacts of each pair mounted to yield from a position adjacent the level of the leading end edge of a card that has for the first time been fully inserted into said frame, downwardly over said superposed pairs of contacts under pressure by the leading end edge of cards, pushed into said frame, that have previously been inserted into said frame; a normally open control switch in the power circuit of said first solenoid; a second solenoid operable upon energization to actuate said printing mechanism; a normally open control switch for said second solenoid; and means effective when a card inserted into said frame reaches its lowermost position as determined by said card positioning means, to close the control switch of the power circuit of said first solenoid and thus energize said first solenoid to shift said ribbon into its second position, provided said conductive strip is in a position wherein it connects a pair of contacts, and to then close the control switch of said second solenoid, and thus activate said printing mechanism.

References Cited in the file of this patent

UNITED STATES PATENTS 2,171,167 Streckfuss ---------------- Aug. 29, 1939
2,824,777 Gieringer ----------------- Feb. 25, 1958